(12) United States Patent
Liu

(10) Patent No.: US 12,333,917 B2
(45) Date of Patent: Jun. 17, 2025

(54) SMART DEVICE WITH SWITCH TO ENABLE PRIVACY FEATURE

(71) Applicant: HUAWEI TECHNOLOGIES CO., LTD., Shenzhen (CN)

(72) Inventor: Jinshui Liu, Plano, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/332,521

(22) Filed: Jun. 9, 2023

(65) Prior Publication Data

US 2023/0316883 A1 Oct. 5, 2023

Related U.S. Application Data

(63) Continuation of application No. PCT/US2020/065360, filed on Dec. 16, 2020.

(51) Int. Cl.
| | |
|---|---|
| H04N 7/18 | (2006.01) |
| G08B 13/196 | (2006.01) |
| H04N 23/51 | (2023.01) |
| H04N 23/611 | (2023.01) |
| H04N 23/62 | (2023.01) |

(52) U.S. Cl.
CPC ....... *G08B 13/19636* (2013.01); *H04N 7/183* (2013.01); *H04N 23/51* (2023.01); *H04N 23/611* (2023.01); *H04N 23/62* (2023.01)

(58) Field of Classification Search
CPC .............................................. G08B 13/19636
USPC ...................................................... 348/143
See application file for complete search history.

(56) References Cited

U.S. PATENT DOCUMENTS

| | | | | |
|---|---|---|---|---|
| 7,394,451 B1* | 7/2008 | Patten | ................... | G06F 1/3203 |
| | | | | 345/905 |
| 8,902,318 B1* | 12/2014 | Haddad | ................. | H04N 23/45 |
| | | | | 348/222.1 |
| 2008/0218493 A1* | 9/2008 | Patten | ...................... | G09G 5/10 |
| | | | | 345/173 |
| 2012/0044367 A1* | 2/2012 | Krachtus | ............ | H04N 1/00132 |
| | | | | 348/E5.025 |
| 2012/0130513 A1* | 5/2012 | Hao | ....................... | G05B 15/02 |
| | | | | 700/90 |
| 2013/0222609 A1 | 8/2013 | Soffer | | |

(Continued)

FOREIGN PATENT DOCUMENTS

| | | |
|---|---|---|
| CN | 108184086 A | 6/2018 |
| KR | 101621723 | 5/2016 |

OTHER PUBLICATIONS

International Search Report and Written Opinion dated Nov. 3, 2021, International Application No. PCT/US2020/065360.

(Continued)

*Primary Examiner* — Leron Beck
(74) *Attorney, Agent, or Firm* — Pearl Cohen Zedek Latzer Baratz LLP

(57) ABSTRACT

The present technology discloses a security camera that includes a housing and a hardware switch coupled to the housing and an audio component of the security camera. The hardware switch has an ON position and an OFF position. When the hardware switch is in an ON position, the audio component of the camera is operational. When the hardware switch is in an OFF position, the audio component of the camera is non-operational.

19 Claims, 7 Drawing Sheets

(56) References Cited

U.S. PATENT DOCUMENTS

| | | | |
|---|---|---|---|
| 2014/0347565 A1* | 11/2014 | Fullam | H04N 21/44227 |
| | | | 348/738 |
| 2015/0281548 A1* | 10/2015 | Yang | H04N 23/695 |
| | | | 348/143 |
| 2015/0316990 A1 | 11/2015 | Pacheco et al. | |
| 2016/0065806 A1* | 3/2016 | Osborne | H04N 23/50 |
| | | | 348/373 |
| 2016/0255254 A1* | 9/2016 | Freeman | H04N 23/51 |
| | | | 348/374 |
| 2018/0013934 A1* | 1/2018 | Germe | G08B 25/08 |
| 2018/0077391 A1* | 3/2018 | Siminoff | H02G 3/081 |
| 2019/0068895 A1 | 2/2019 | Hutz et al. | |
| 2020/0112587 A1 | 4/2020 | Jakubowski et al. | |
| 2020/0226896 A1 | 7/2020 | Robertson et al. | |

OTHER PUBLICATIONS

International Preliminary Report on Patentability dated Jun. 29, 2023, International Application No. PCT/US2020/065360.
Office Action dated Feb. 26, 2025, Chinese Patent Application No. 202080107896.7, 10 pages.

\* cited by examiner

SMART DEVICE WITH SWITCH TO ENABLE PRIVACY FEATURE

CLAIM OF PRIORITY

This application is a continuation of, and claims priority to, PCT Patent Application No. PCT/US2020/065360, entitled "SMART DEVICE WITH SWITCH TO ENABLE PRIVACY FEATURE", filed Dec. 16, 2020, which application is incorporated by reference herein in its entirety.

FIELD

This disclosure generally relates to smart devices and privacy.

BACKGROUND

The presence of video cameras and microphones in computerized products, such as home network security cameras, creates an information security and privacy protection challenge today. As home network security cameras connected to public networks and to the Internet become increasingly prevalent, the risk of a hacker remotely controlling these devices also increases. Since these products have internal or external image capturing sensors and microphones, they are continually at risk of becoming an eavesdropping device that breaches the security and privacy of individuals in their own homes.

SUMMARY

According to one aspect of the present disclosure, there is a security camera, comprising a housing; and a hardware switch coupled to the housing and an audio component of the security camera, the hardware switch having an ON position and an OFF position, wherein when the hardware switch is in an ON position, the audio component of the camera is operational, and when the hardware switch is in an OFF position, the audio component of the camera is non-operational.

Optionally, in any of the preceding aspects, hardware switch is located inside of the housing; and further comprising a removable cover attached to the housing, that when removed, provides access to the hardware switch located inside the housing.

Optionally, in any of the preceding aspects, the hardware switch is accessible from the outside of the housing and waterproof.

Optionally, in any of the preceding aspects, the hardware switch is mechanically toggled into the ON position or the OFF position.

Optionally, in any of the preceding aspects, the method further comprising a controller coupled to the hardware switch and configured to identify when the hardware switch is toggled into the ON position or the OFF position.

Optionally, in any of the preceding aspects, when the hardware switch is in the OFF position, the audio component of the security camera is prevented from communicating with the controller.

Optionally, in any of the preceding aspects, the method further comprising an image sensor configured to capture an image or a sequence of images, the image or sequence of images including a mouth of a person, wherein the mouth of the person in the image or sequence of images is detected by the controller and scrambled using data scrambling to obfuscate the mouth of the person.

Optionally, in any of the preceding aspects, the data scrambling obfuscates the mouth of the person when the hardware switch controlling the audio component is in the OFF position, or the hardware switch controlling the audio component is in the ON position and the controller identifies a mouth scrambling switch on a client device is in the ON position.

Optionally, in any of the preceding aspects, the hardware switch is one of a single pole single throw switch or two single pole single throw switches, and the hardware switch controls an ON/OFF state of a corresponding audio component of the security camera.

Optionally, in any of the preceding aspects, the audio component is one of a microphone and a speaker.

According to one aspect of the present disclosure, there is a computer-implemented method of securing privacy in a security camera, comprising determining, by a controller of the security camera, that a hardware switch is moved in a position configured to enable or disable an audio component of the security camera, wherein when the hardware switch is OFF, the audio component of the security camera is non-operational, and when the hardware switch is in an ON position, the audio component of the security camera is operational; and scrambling, by the controller of the security camera, a portion of an image or a sequence of images received by the security camera when the hardware switch of the audio component is in the OFF position.

Optionally, in any of the preceding aspects, the method further comprising sending, by an interface of the security camera, a status signal to a client device, the status signal indicating that the audio component is enabled or disabled based on the position of the hardware switch.

Optionally, in any of the preceding aspects, the method further comprising capturing an image or a sequence of images, by an image senor of the security camera, of a mouth of a person.

Optionally, in any of the preceding aspects, the mouth of the person in the image or sequence of images is detected by the controller and scrambled using data scrambling to obfuscate the mouth of the person.

Optionally, in any of the preceding aspects, the data scrambling obfuscates the mouth of the person when the hardware switch controlling the audio component is in the OFF position, or the hardware switch controlling the audio component is in the ON position and the controller identifies a mouth scrambling switch on a client device is in the ON position.

Optionally, in any of the preceding aspects, an OFF position of a first hardware switch disables a first audio component of the camera, and an OFF position of a second hardware switch disables a second audio component of the camera.

Optionally, in any of the preceding aspects, the first component is a microphone and the second component is a speaker.

Optionally, in any of the preceding aspects, the method further comprising updating the status signal when the hardware switch toggles between an ON or OFF position.

Optionally, in any of the preceding aspects, the method further comprising sending the updated status signal to the client device, the updated status signal indicating that the position of the hardware switch has toggled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which generally relate to transmission of data in a network.

The technology relates to a smart device with one or more hardware switches to activate and deactivate one or more components in the smart device. The incorporation of a hardware or physical switch into the smart device allows a user to selectively activate and deactivate components in the smart device and provides a level of security and privacy not otherwise available. For example, the switch can disconnect or disable components which may otherwise be used to invade or compromise a user's privacy (for example, a camera, microphone, speaker, etc.). The switches can operate to disable a corresponding component when in the OFF position, thereby providing an easy mechanism to ascertain whether the component is operational or non-operational. In one embodiment, when the switch is in the OFF position, a physical connection or signal between the component and a controller or processor of the smart device is disabled, rendering the component inaccessible to the smart device.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
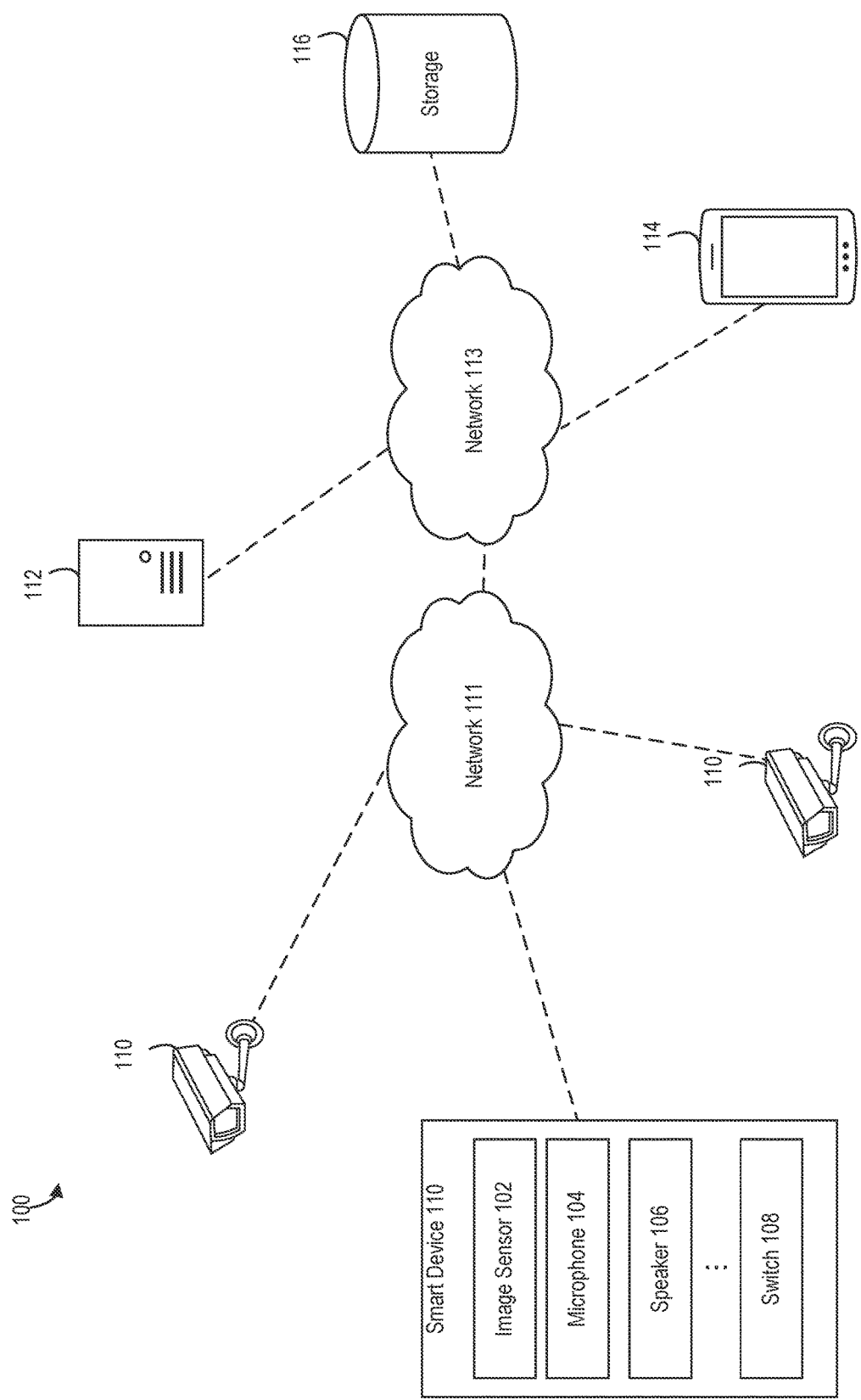
FIG. 1 illustrates an example of a smart device system.

FIG. 1 illustrates an example of a smart device system. The smart device system 100 includes a smart device 110, a server 112, client device 114 and storage 116. In one embodiment, and as depicted, the smart device 110 is a camera, such as a video camera. It is appreciated that the smart device system 100 is not limited to the depicted components and that any number of the components may be part of the smart device network 100. For example, the smart device system 100 may include more or fewer smart devices 110, servers 112, client devices 114 and storage devices 116.

In the embodiment of FIG. 1, the smart device 110 is a camera that includes one or more image sensors 102, a microphone 104, a speaker 106 and one or more switches 108. In one embodiment, the switch 108 is a physical or hardware switch. The smart device 110 (e.g., camera) may comprise, for example, a high definition (HD) image sensor, such as one capable of capturing video images at an image display resolution of 720p, or 1080p, or better. Although not shown, the smart device 110 may also include other hardware and/or components, such as memory (e.g., volatile and/or non-volatile memory), a housing, one or more motion sensors (and/or other types of sensors), etc. It is also appreciated that the smart device 110 is not limited to a camera and may be any type of smart device or Internet of Things (I) device, as discussed in more detail below.

In one embodiment, the smart device 110 communicates with a local network 111. The local network 111 may be, for example, a wired and/or wireless (WiFi) network compatible with the IEEE 802.11 standard and/or other wireless communication standard(s). Although not shown, the local network 111 may also communicate with a variety of other connected devices and is not limited to the depicted embodiment. The local network 111 may also be connected to a public network 113, such as the Internet and/or a public switched telephone network (PSTN). As described below, the smart device 110 may communicate with the client device 114 via the network 111 and/or the public network 113. The client device 114 may comprise, for example, a mobile device such as a smartphone, a personal digital assistant (PDA), a computer, or another communication device. The client device 114 comprises a display (not shown) and related components capable of displaying streaming and/or recorded video images acquired by smart device 110. In one embodiment, the client device 114 may also comprise a speaker and related components capable of broadcasting streaming and/or recorded audio, and may also comprise a microphone.

In a further embodiment, the smart device 110 may also communicate with one or more storage devices 116 and one or more servers 112 via the public network 113 (e.g., a personal wired or wireless network) and the local network 111 (e.g., Internet/PSTN). While the depicted embodiment illustrates the storage device 116 and the server 112 as components separate from the local network 111, it is to be understood that the storage device 116 and the server 112 may be components of the local network 111. In another embodiment, the storage device 116 and the server 112 may be part of the local network 111 or any combination thereof.

The public network 113 may be any wireless network or any wired network, or a combination thereof. For example, the public network 113 may include a wide area network (e.g., the Internet, an enterprise network), a telephone network, a data network associated with a telephone/voice provider (e.g., a mobile communications provider data and/or voice network), a direct connection between two computing devices, and any combinations thereof.

Figure 2:
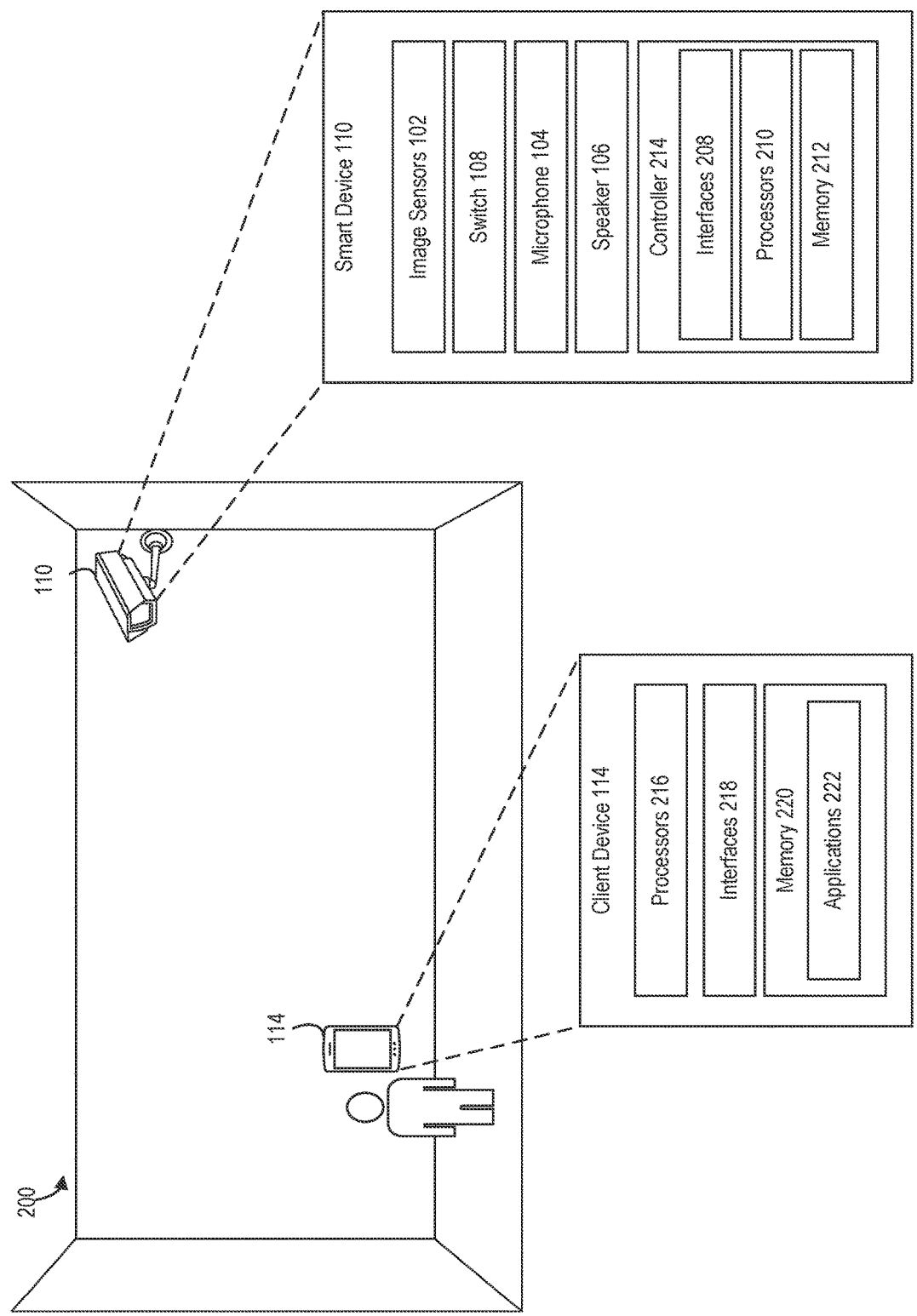
FIG. 2 illustrates an example of a smart home monitoring system.

FIG. 2 illustrates an example of a smart home monitoring system. The smart home monitoring system, which may be the same or supplement the smart device system 100, monitors an environment 200 using, for example, one or more smart devices 110 and a client device 114. The smart devices 110 and the client device 114 may be connected, for instance, using a local network, such as local network 111, and/or a public network, such as network 113. In the depicted example, the smart device 110 is a camera, such as a video camera, that is mountable on a wall in the environment 200 being monitored by the smart home monitoring system. In one embodiment, the smart device 110 may be accessed by a user via the client device 114, which allows the user to operate the camera to monitor the environment 200. Although not illustrated, it is appreciated that any number of smart devices 110 and client devices 114 may be employed in the home monitoring system, and the system is not limited to the disclosed embodiments.

The client device 114 includes, for instance, processor 216, interface 218 and memory 220, which includes an application 222. Examples of client devices 114 include, but are not limited to, any suitable type of computing device, such as a general purpose computer, special purpose computer, laptop, desktop, mobile device, navigation system, smartphone, tablet, wearable computing device (e.g., head mounted display or smart watch), a display with one or more processors, or other suitable computing device. Although located within the environment 200 in the depicted embodiment, the client device 114 may also be remotely located from the environment 200 and the smart device 110 and communicate via a network, such as public network 113.

In one embodiment, the smart device 110 (e.g., camera) includes one or more image sensors 102, a microphone 104, a speaker 106 and one or more switches 108, similar to the smart device 110 illustrated in FIG. 1. The image sensor 102 may, for example, capture light focused by a lens on the smart device 110, and convert the captured light into signals that may be recorded as digital data. In some implementations, the image sensor 102 uses charge-coupled devices (CCD), complementary metal oxide semiconductors (CMOS), or N-type metal oxide semiconductor (NMOS) technologies. The microphone 104 may comprise an acoustic-to-electric transducer or sensor that converse sound from the environment 200 into an electrical signal, while the speaker 106 may comprise one or more electroacoustic transducers that convert electrical audio signals into corresponding sounds for output in the environment 200. The switch 108, described in more detail below, may be a hardware or physical switch on the smart device 110 that is operative to turn ON and turn OFF various components, such as the image sensor 102, microphone 104 and speaker 106.

The smart device 110 further contains a controller 214, which includes one or more network interfaces 208, one or more processors 210, and memory 212. The network interface 208 may be connected to a network (a local area network, a wide area network, the Internet) through a wired or wireless connection, and communicate with a remote system (e.g., a video or other server system). The communication may include, for example, transmission of images and video to the remote system for storage and processing. The network interface 208 may also include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol.

The processor 210 (and processor 216) may include one or more processors and/or a processor having multiple cores. Further, the processor 210 may comprise one or more cores of different types. For example, the processors 210 may include application processor units, graphic processing units, and so forth. In one implementation, the processor 210 may comprise a microcontroller. In further embodiments, the processor 210 may comprise an encoding and compression chip. In still other embodiments, the processor 210 may process video captured by the image sensor 102 and audio captured by the microphone 104, and may transform this data into a form suitable for wireless transfer by the network interface 208 to a network. In yet another embodiment, the processors 210 executes programs and instructions that are stored in memory 212.

The memory 212 (and memory 220) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store desired information, and which can be accessed by a computing device. The memory 212 may be implemented as computer-readable storage media, which may be any available physical media accessible by the processor 210 to execute instructions stored on the memory 212. In one basic implementation, the computer-readable storage media may include random access memory ("RAM") and Flash memory. In other implementations, computer-readable storage media may include, but is not limited to, read-only memory ("ROM"), electrically erasable programmable read-only memory ("EEPROM"), or any other tangible medium which can be used to store desired information, and which can be accessed by the processor 210.

It is appreciated that the memory 212 may include at least one operating system (OS) module that is configured to manage hardware resource devices such as the network interface 208 (and interface 218), the I/O devices of the respective apparatuses, and so forth, and provide various services to applications or modules executing on the processors.

In some implementations, the smart home monitoring system includes more than one network-connected smart device 110 (e.g., network connected cameras) that are configured to provide video monitoring and security in the environment 200. In one embodiment, users may control the smart devices 110 in the smart home monitoring system using a network-connected client device 114, such as a computer or mobile device. In this case, users may be able to additionally operate mechanical or hardware switches on the cameras to turn ON/OFF various camera components, as discussed further below.

Figure 3A:
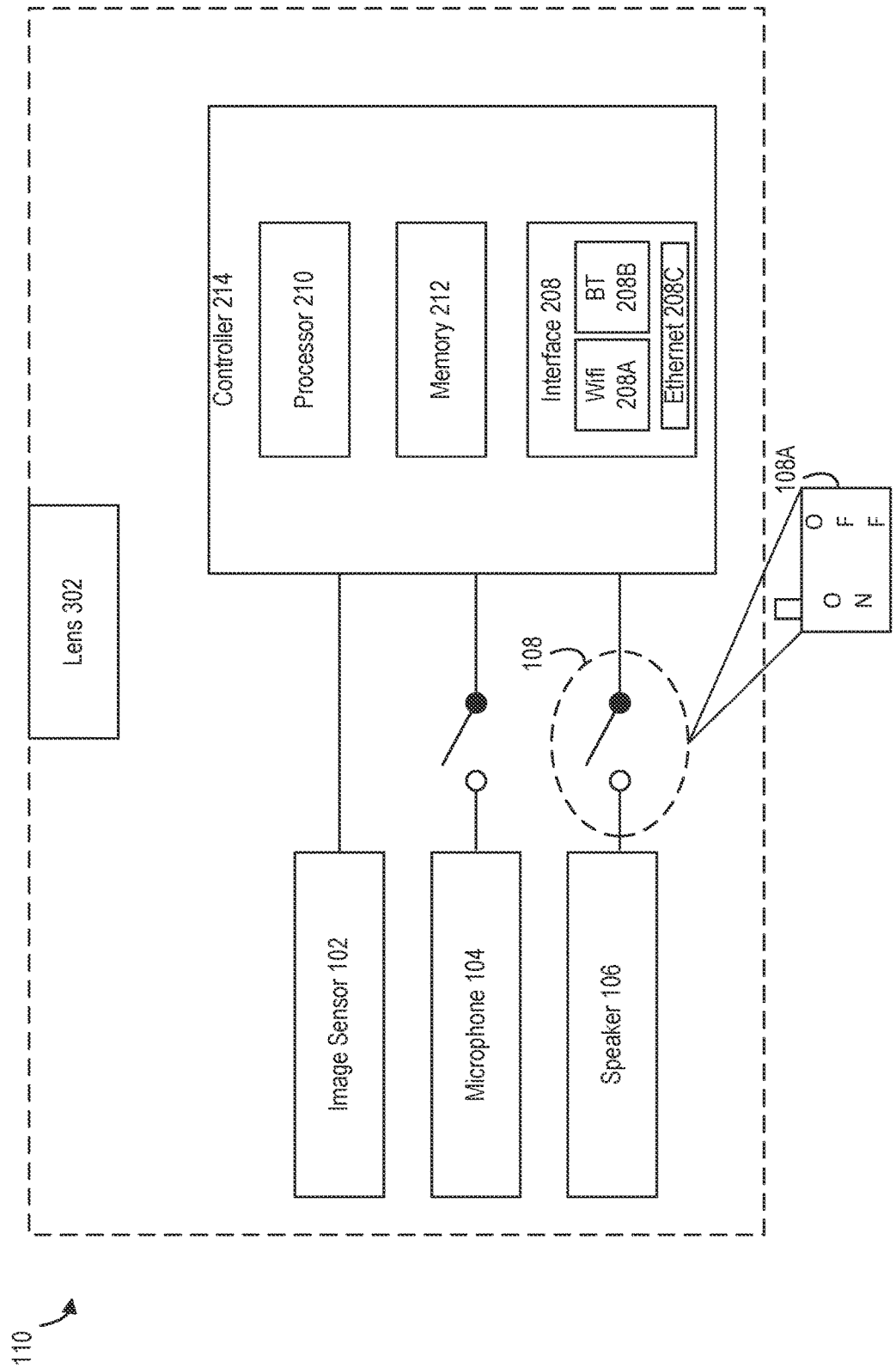
FIG. 3A illustrates an example embodiment of a smart device with a switch in accordance with the disclosed embodiments.

FIG. 3A illustrates an example embodiment of a smart device with a switch in accordance with the disclosed embodiments. The smart device 110 is a video camera in the illustrated embodiment that may be used, for example, in the smart device system 100 (FIG. 1) or the home monitoring system of environment 200 (FIG. 2) to capture images and video. As illustrated, the smart device 110 (e.g., camera) includes an image sensor 102, microphone 104, speaker 106, switches 108, and controller 214, as described above with reference to FIGS. 1 and 2. The smart device 110 further includes a lens 302 that receives and focuses light onto the image sensor 102. In some implementations, the smart device 110 may communicate with one or more other smart devices 110, computers, devices, or systems through network interface 208. For example, the smart device 110 may be connected to a network (a local area network, a wide area network, the Internet) through a wired or wireless connection, and communicate with a remote system (e.g., a video or other server system). The communication may include, for example, transmission of images and video to the remote system for storage and processing.

The controller 214, including components supplemental to those discussed with reference to FIG. 2, includes a video front-end, video and audio CODECs, a USB interface, power supplies and other circuitry needed to support a video sensor. Audio CODECs may be in a form of a CODEC chip or chips and may comprise a microphone mute input (not shown) controlling the state of the CODEC function. In one embodiment, the mute input is controlled by a switch, for example the switch 108 between the controller 214 and the microphone 104. The processor 210 in the controller 214 may perform functions such as: image signal processing (ISP) and compression with various interfaces such as CPU type parallel, RS-232, 5-line serial interface, USB full/high speed device controller, and USB full speed host controller. The controller 214 may also include the afore-mentioned network interface 208, which may further include a variety of communication interfaces, such as but not limited to, a WiFi 208A component, Bluetooth™ component 208B, or Ethernet 208C. In a further embodiment, the controller 214 may operate the switch 108 to control various components of the smart device 110, for example, by processing input commands by a user via a client device 114.

Switch 108 allows a user in the environment or in proximity to the smart device 110 to enable and disable features of the smart device 110 with a simple toggle of the mechanical switch into an ON or an OFF position. For example, the mechanical or hardware switch 108 may be a single pole single throw (SPST) switch, a dual SPST switch, a double throw switch, etc.

In one embodiment, the switch 108 provides enhanced security to the smart device 110 by allowing users to mechanically enable and disable hardware components on the smart device 110. The term "switch" as used herein represents a collective term for multiple types of switches or circuit-breakers designed to disable or alter a state of a component (e.g., an electro-mechanical function, a transistor, an electrical signal or the like) when activated. For example, the switch 108 may include a toggle switch 108A, such as a SPST switch. In another example, an actuator (not shown) may engage the switch 108. The actuator may comprise a physical connection to a device such as a lanyard that when broken or disconnected causes the actuator to send a signal to the switch 108.

In the depicted embodiment, and as described above, the smart device 110 is a camera with one or more image sensors 102, a microphone 104 and a speaker 106. The switch 108 may be located on or near the camera such that movement of the moveable portion (e.g., toggle) from an ON position to an OFF position causes one or more of the components to which the switch 108 is attached to be disabled. Similarly, movement of the moveable portion from an OFF position to an ON position causes one or more of the components to which the switch 108 is attached to be enabled. In one embodiment, the switch 108 is accessible from the housing of the camera and may be waterproof. In another embodiment, the switch 108 is located inside of the camera, for example, behind a removable cover attached to the housing.

In another embodiment, when the switch 108 is moved to the ON position, the controller 214 in the camera can recognize that a component corresponding to the switch 108 has been enabled. That is, the controller 214 can read the status of a switch 108 corresponding to a component in order to determine its state (e.g., enabled/disabled). When enabled, the controller 214 can signal the component to activate. For example, toggling the switch 108 to an ON position for the microphone 104 will cause the component to be activated such that a user may speak into the camera via the microphone 104. In another example, toggling the switch 108 to an ON position for the image sensor 108 will cause the component to be activated such that images or video received by the camera will be captured. In still another example, toggling switch 108 into the ON position may activate WiFi 208A or BT 208B. While in the activated state, WiFi 208A and BT208B allow the camera to communicate, for example, with client device 114 via a network, Bluetooth or some other form of wireless communication. In still one embodiment, when the WiFi 208A or BT 208A is activated, an application associated with the component may launch. For example, a camera application may launch on the client device 114 so that the user has access to the camera.

When the switch 108 is toggled to the OFF position, the corresponding component is deactivated or causes a loss of signal between the component and the controller 214. For example, if the switch 108 corresponding to speaker 106 is toggled to the OFF position, the speaker 106 will be deactivated such that a user in the environment or in close proximity to the camera will no longer hear sound from the speaker 106. In still another example, toggling the switch 108 corresponding to the microphone 104 will cause the microphone 104 to be deactivated such that a verbal or audio communications with the camera will cease.

In addition to disabling the above-noted components via the switch 108, it is appreciated that the disabling of components of the camera can include disconnecting the signal path between the component and controller 214 of the camera.

In another implementation, the processor 210 or controller 214 can also be configured to disable communication with the camera in response to activation of the switch. For example, a network connection between the camera and a router connecting to the camera to WiFi can be severed so that data captured by the image sensors 102 cannot be transmitted to another device, such as client device 114. For example, the switch 108 can be configured to sever an Internet connection of the camera or cause camera to restrict data transmission while the switch 108 is activated.

Figure 3B:
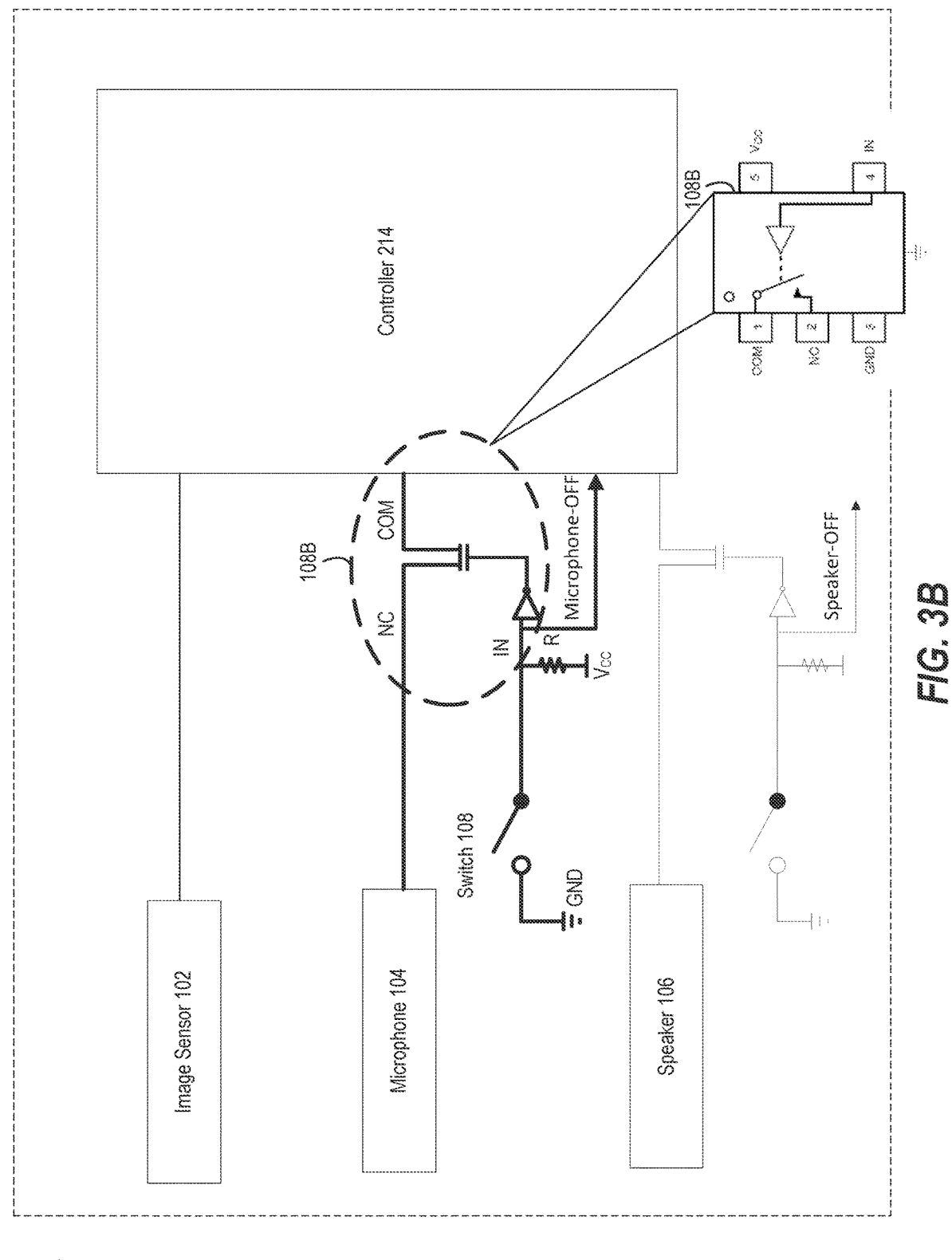
FIG. 3B illustrates an example of the switch in the smart device of FIG. 3A.

One specific embodiment is shown in FIG. 3B, which illustrates an analog switch or amplifier connected to switch 108 for ON/OFF control. The analog switch or amplifier 108B may be separate from or integrated into the camera controller 214. This type of analog switch or amplifier 108B has low resistance and capacitance characteristic that work well with low-distortion audio, video and data routing applications when it is enabled or ON. The illustrated analog switch has a NC logic configuration such that the switch is ON (NC connected to COM) when IN is low. As shown in the pin assignments for analog switch 108B, the COM is a common signal line, the NC is the normally closed signal line, the GND is the ground, the IN is the control signal line and the $V_{CC}$ is the voltage supply.

Figure 4:
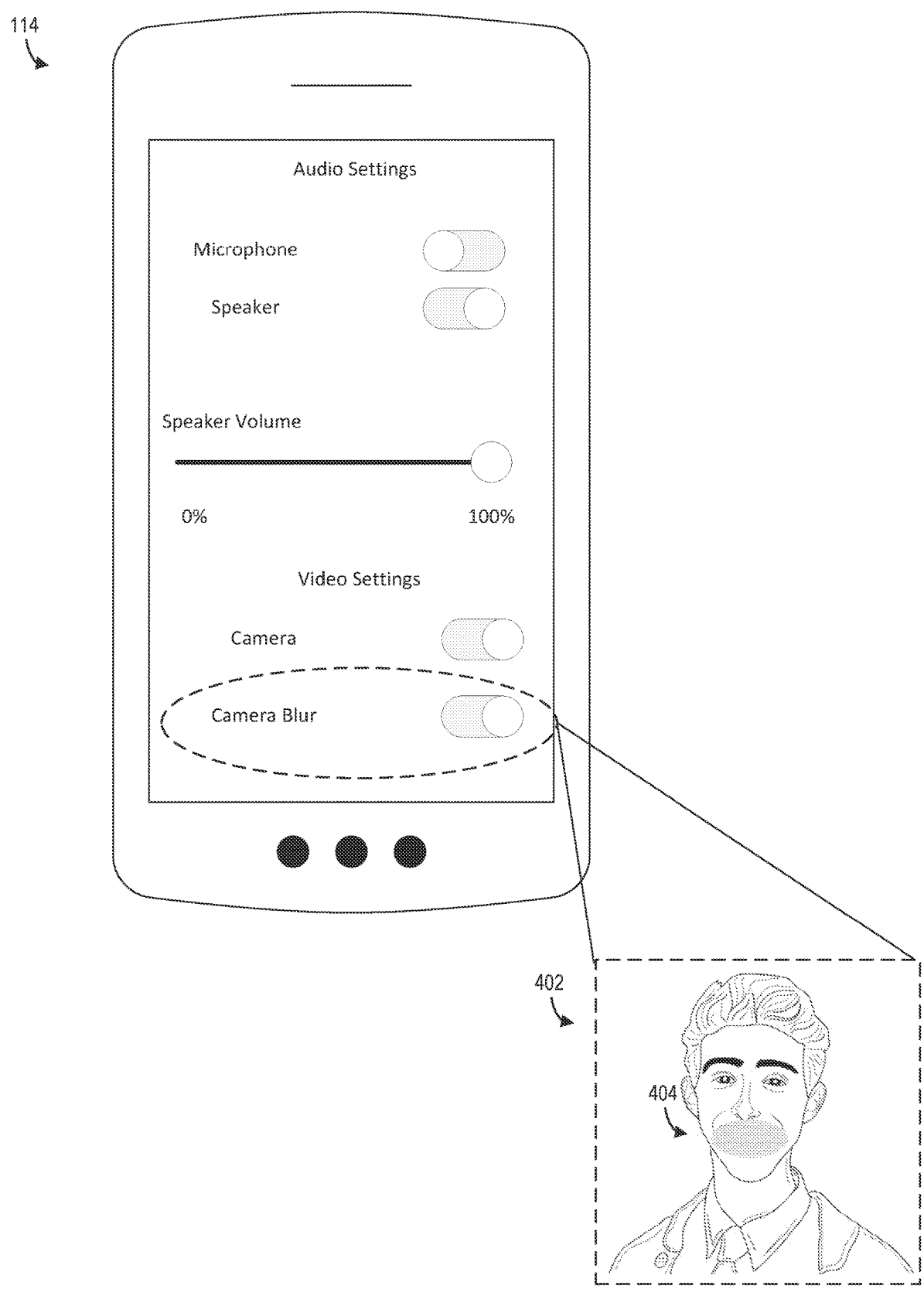
FIG. 4 illustrates an example of a graphical user interface for a client device.

FIG. 4 illustrates an example of a graphical user interface for a client device. A client device 114, such as a smart phone, includes a display showing audio and video settings. In the illustrated embodiment, the client device 114 has access to a smart device 110, such as a camera in the home monitoring system of FIG. 2. For example, the client device 114 may store and execute an application associated with the camera that allows access to the camera when executed. More specifically, as shown, the graphical user interface (GUI) includes toggle or buttons for audio settings, including the microphone 104 and the speaker 106 (and speaker volume) of a corresponding smart device 110, and video settings, including the camera and a camera blur option.

The camera may be configured to monitor captured image data. For example, the camera may be directed towards the environment 200 (FIG. 2) to capture images of a person. The captured images may be transmitted to the controller 214 for surveillance purposes pertaining to the person in the environment 200. It is appreciated that while monitoring is discussed with reference to the controller 214, other components, such as the processor 210, and devices, such as the client device 114 and the server 112 may also be responsible for monitoring captured images.

In one embodiment, the controller 214 may collect images of the environment 200 and identify portions of the collected images (or sequence of images) that include privacy regions. The privacy regions may correspond to particular objects, particular users, particular human-object-interactions, particular human-actions, particular geographical locations, and the like. For example, images of a person in the environment 200 may include a mouth that is identified as a privacy region. In one embodiment, the controller 214 can be configured to identify privacy regions by comparing the captured image data to predefined privacy regions. For example, the controller 214 can be trained using a database of images or deep learning neural network models. Each of the images in the database may include predefined privacy regions that identify privacy entities, such as users or objects, that are included in the images.

In some implementations, the controller 214 can perform obfuscation of the identified privacy regions. For example, and as illustrated, a person 402 may include a mouth that is identified as a privacy region 404 such that the privacy region of the image is obfuscated. The controller 214 can be configured to obfuscate the privacy regions 404 and only provide non-privacy regions as output to the client device 114. In some aspects, the controller 214 is configured to provide the captured images with the obfuscated privacy regions 404 contained in the image as output to the client device 114, as illustrated.

In one embodiment, the controller 214 determines an obfuscation technique for the particular object based on the object type or deep learning neural network model execution output. The controller 214 may apply one or more different obfuscation techniques to the particular object based on the object type or deep learning neural network model execution output. For example, a person may be speaking. As such, the mouth may be determined to be the particular object that is associated with the first object type. In this instance, the mouth may be obfuscated or blurred by scrambling the privacy region 404 in the image. The controller 214 may then obfuscate or blur the particular object using the determined obfuscation technique. In one embodiment, the controller 214 can be configured to automatically perform a particular obfuscation technique on the particular object based on the object type. As noted above, it is appreciated that while obfuscation is discussed with reference to the controller 214, other components and devices may also perform the obfuscation techniques.

Figure 5:
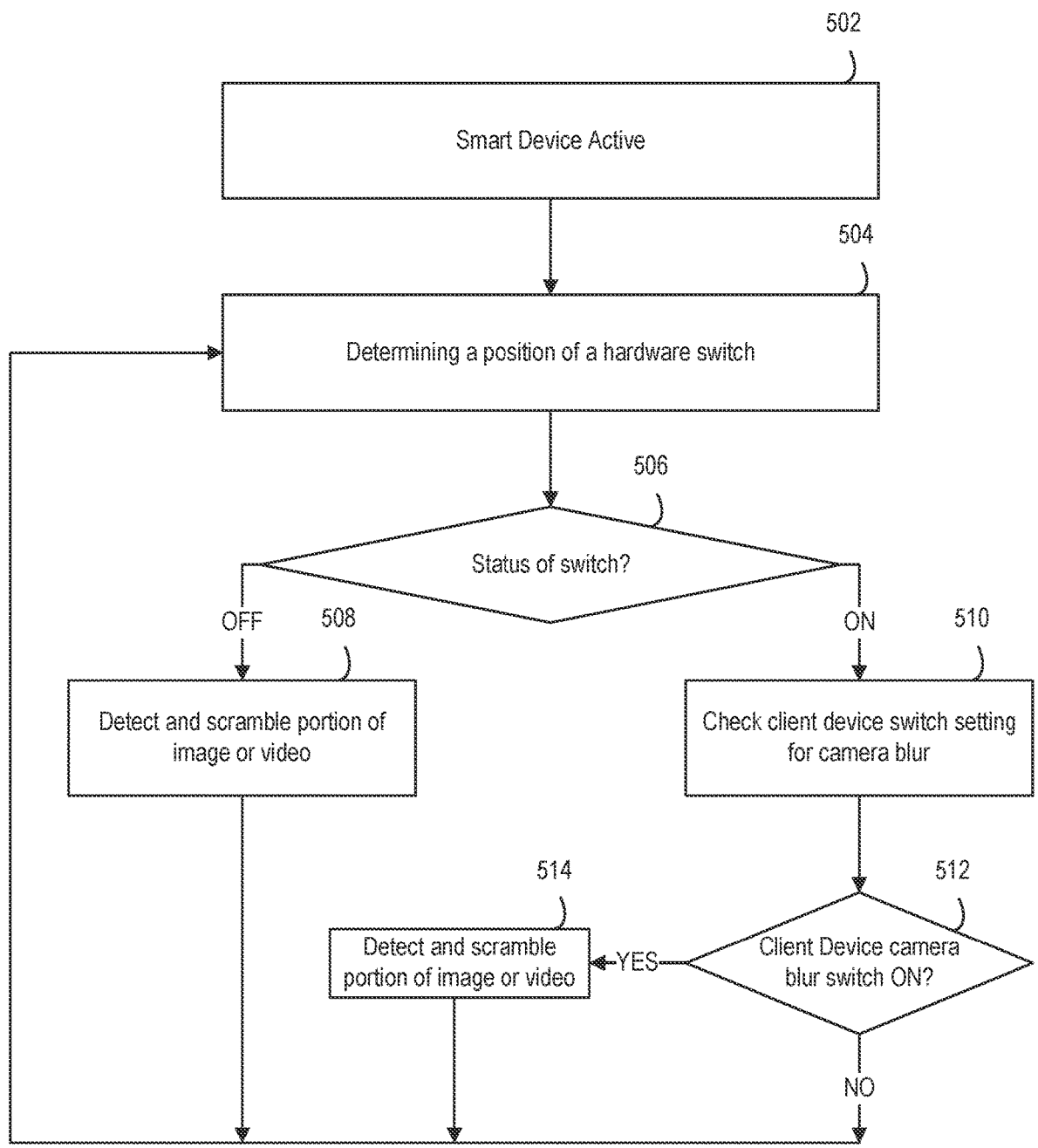
FIG. 5 illustrates an example flowchart of securing privacy in a smart device.

FIG. 5 illustrates an example flowchart of securing privacy in a smart device. In the discussion that follows, the controller 214, including processor 210, perform the procedures. However, it is appreciated that any other functional unit or processing unit may implement the processes described herein, and the disclosure is not limited to implementation by the controller and processor.

At step 502, the controller 214 determines that the smart device 110 (e.g., camera) is active and operational.

Once operational, at step 504, the controller 214 determines a position of one or more switches 108, where each switch 108 corresponds to one or more components in the smart device 110. Each switch 108 may enable or disable a corresponding one or more components (e.g., image sensors, microphone, speaker, etc.) of the smart device 110 depending on the ON/OFF position of the switch 108.

At step 506, the status of the one or more switches 108 are determined. A switch 108 determined to be in an ON position for a corresponding component of the smart device 110 means that the component is operational or enabled. In this case, a connection (e.g., a signal path) between the corresponding component and the controller 214 is enabled, and the controller 214 will check whether the client device has a switch set for camera blur (e.g., mouth scrambling), at step 510. For example, when images or video captured by the camera is enabled (i.e., the image sensor is enabled), the controller 214 may check the camera blur switch setting to scramble or blur (or otherwise obfuscate) one or more portions of the captured images or video. At step 512, the controller 214 determines with the client device 114 camera blur switch is in the ON position. If the camera blur switch is in the ON position, the controller 214 will detect and scramble one or more portions of the image or video (e.g., scramble the mouth of a person), at step 514. For example, the camera may be recording a video of a person in the environment of a home (e.g., the image sensor 102 of the camera is turned ON and enabled) when the microphone 104 has been disabled by toggling a corresponding switch 108 to the OFF position. In this situation, although audio has been disabled, it may nevertheless remain possible to obtain the audio via lip reading or some other form of communication (e.g., sign language) being captured in the video. In order to ensure privacy of the person of the person being recorded, and to prevent any capturing of otherwise disabled audio, the user may opt to scramble or blur (obfuscate) a portion of the video (e.g., the mouth) of a person, as discussed above.

A switch 108 determined to be in an OFF position for a corresponding component of the smart device 110 means that the component is non-operational or disabled. In this case, the controller 214 will detect and scramble one or more portions of the image or video (e.g., scramble the mouth of a person), at step 508. In one optional embodiment, the smart device 110 may send, via an interface 208, such as a WiFi interface, a status signal to a client device 114. In one embodiment, the status signal indicates that the corresponding component is enabled or disabled based on a position of the one or more switches 108.

As images are captured by the smart device 110, it is continually monitored to determine the position and status of the switches 108, and to enable or disable components based on the status.

Figure 6:
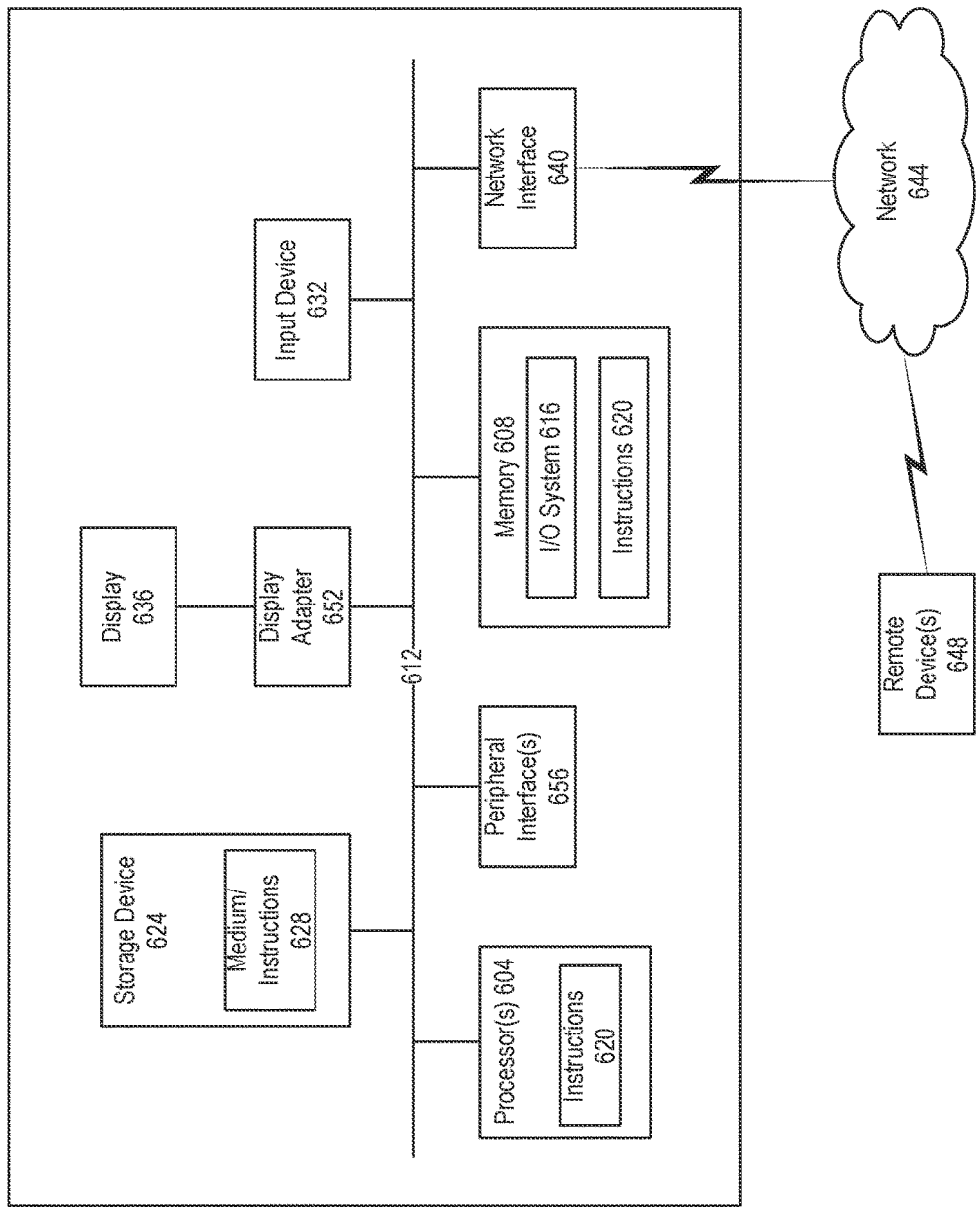
FIG. 6 illustrates a schematic diagram of a general-purpose network component or computer system.

FIG. 6 shows an example embodiment of a computing system for implementing embodiments of the disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the preceding detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security camera, comprising:
   a housing;
   a controller; and
   a hardware switch coupled to the housing and an audio component of the security camera, the hardware switch having an ON position and an OFF position, wherein when the hardware switch is in an ON position, the audio component of the security camera is operational, when the hardware switch is in an OFF position, the audio component of the security camera is non-operational, and
   the controller is configured to scramble a portion of an image received by the security camera when the hardware switch of the audio component is in the OFF position, and the controller is configured to determine whether a client device coupled to the security camera has an image scramble setting enabled when the audio component is in the ON position and if so, scramble the portion of the image.

2. The security camera of claim 1, wherein the hardware switch is located inside of the housing; and
   further comprising
   a removable cover attached to the housing, that when removed, provides access to the hardware switch located inside the housing.

3. The security camera of claim 1, wherein the hardware switch is accessible from the outside of the housing and waterproof.

4. The security camera of claim 1, wherein the hardware switch is mechanically toggled into the ON position or the OFF position.

5. The security camera of claim 1, wherein the controller is coupled to the hardware switch and configured to identify when the hardware switch is toggled into the ON position or the OFF position.

6. The security camera of claim 1, wherein when the hardware switch is in the OFF position, the audio component of the security camera is prevented from communicating with the controller.

7. The security camera of claim 1, further comprising an image sensor configured to capture the image or a sequence of images, the image or sequence of images including a mouth of a person, wherein the mouth of the person in the image or sequence of images is detected by the controller and comprises the portion of the image scrambled using data scrambling to obfuscate the mouth of the person.

8. The security camera of claim 7, wherein the data scrambling obfuscates the mouth of the person when the hardware switch controlling the audio component is in the OFF position, or the hardware switch controlling the audio component is in the ON position and the controller identifies a mouth scrambling switch on a client device is in the ON position.

9. The security camera of claim 1, wherein the hardware switch is one of a single pole single throw switch or two single pole single throw switches, and the hardware switch controls an ON/OFF state of the audio component of the security camera.

10. The security camera of claim 1, wherein the audio component is one of a microphone and a speaker.

11. A computer-implemented method of securing privacy in a security camera, comprising:
   determining, by a controller of the security camera, that a hardware switch is moved in a position configured to enable or disable an audio component of the security camera, wherein when the hardware switch is OFF, the audio component of the security camera is non-operational, and when the hardware switch is in an ON position, the audio component of the security camera is operational; and
   scrambling, by the controller of the security camera, a portion of an image or a sequence of images received by the security camera when the hardware switch of the audio component is in the OFF position, and scrambling the portion of the image or the sequence of images when a client device coupled to the security camera has an image scramble setting enabled and when the audio component is in the ON position.

12. The computer-implemented method of claim 11, further comprising sending, by an interface of the security camera, a status signal to a client device, the status signal indicating that the audio component is enabled or disabled based on the position of the hardware switch.

13. The computer-implemented method of claim 11, further comprising capturing the image or sequence of images, by an image sensor of the security camera, of a mouth of a person.

14. The computer-implemented method of claim 13, wherein the mouth of the person in the image or sequence of images is detected by the controller and scrambled using data scrambling to obfuscate the mouth of the person.

15. The computer-implemented method of claim 14, wherein the data scrambling obfuscates the mouth of the person when the hardware switch controlling the audio component is in the OFF position, or the hardware switch controlling the audio component is in the ON position and the controller identifies a mouth scrambling switch on a client device is in the ON position.

16. The computer-implemented method of claim 14, wherein an OFF position of a first hardware switch disables a first audio component of the camera, and an OFF position of a second hardware switch disables a second audio component of the camera.

17. The computer-implemented method of claim 16, wherein the first component is a microphone and the second component is a speaker.

18. The computer-implemented method of claim 14, further comprising updating the status signal when the hardware switch toggles between an ON or OFF position.

19. The computer-implemented method of claim 18, further comprising sending the updated status signal to the client device, the updated status signal indicating that the position of the hardware switch has toggled.

\* \* \* \* \*